United States Patent [19]

Finney

[11] Patent Number: 4,477,687

[45] Date of Patent: Oct. 16, 1984

[54] THERMOCOUPLE AND METHOD OF MAKING THE THERMOCOUPLE AND OF MOUNTING THE THERMOCOUPLE ON A HEAT EXCHANGER TUBE

[76] Inventor: Philip F. Finney, 425 E. Washington, Villa Park, Ill. 60181

[21] Appl. No.: 501,282

[22] Filed: Jun. 6, 1983

[51] Int. Cl.³ .............................................. H01L 35/02
[52] U.S. Cl. ..................................... 136/229; 29/573;
29/592 R; 136/201; 136/232; 136/233;
136/242; 374/165; 374/179
[58] Field of Search ............. 29/573, 592 R; 136/221,
136/229, 230, 232, 233, 242, 201; 374/165, 179

[56] References Cited

U.S. PATENT DOCUMENTS

| | | | |
|---|---|---|---|
| 1,140,701 | 5/1915 | Mitchell . | |
| 2,048,681 | 7/1936 | Davidson et al. . | |
| 3,143,439 | 8/1964 | Hansen | 136/229 |
| 3,874,239 | 4/1975 | Finney | 136/230 |
| 3,939,554 | 2/1976 | Finney | 29/573 |
| 4,043,200 | 8/1977 | Finney | 374/165 |
| 4,164,433 | 8/1979 | Granahan et al. | 136/232 X |
| 4,338,479 | 7/1982 | Bauman | 136/232 X |

Primary Examiner—Leland A. Sebastian
Attorney, Agent, or Firm—Lee, Smith & Zickert

[57] ABSTRACT

An improved thermocouple and method for making the thermocouple and installing same on the fireside of heat exchanger tubes or the like for monitoring surface temperature which includes a thermocouple assembly made from mineral oxide insulated metal sheathed thermocouple wires where a pair of thermocouple wires or conductors extend through a metal sheath in spaced apart and insulated relation from each other and from the sheath and are connected together at an end to define a hot junction member adapted to be mounted in engagement with the surface being measured, which hot junction is defined by a disk or bar-shaped member extending from the end of the sheated conductor assembly beyond the insulation and sheath but not in contact with the sheath. Installation on a heat exchanger tube includes welding the sheath to the tube which pressurizes the hot junction against the temperature measured surface and defines a heat energy path that bypasses the hot junction.

34 Claims, 15 Drawing Figures

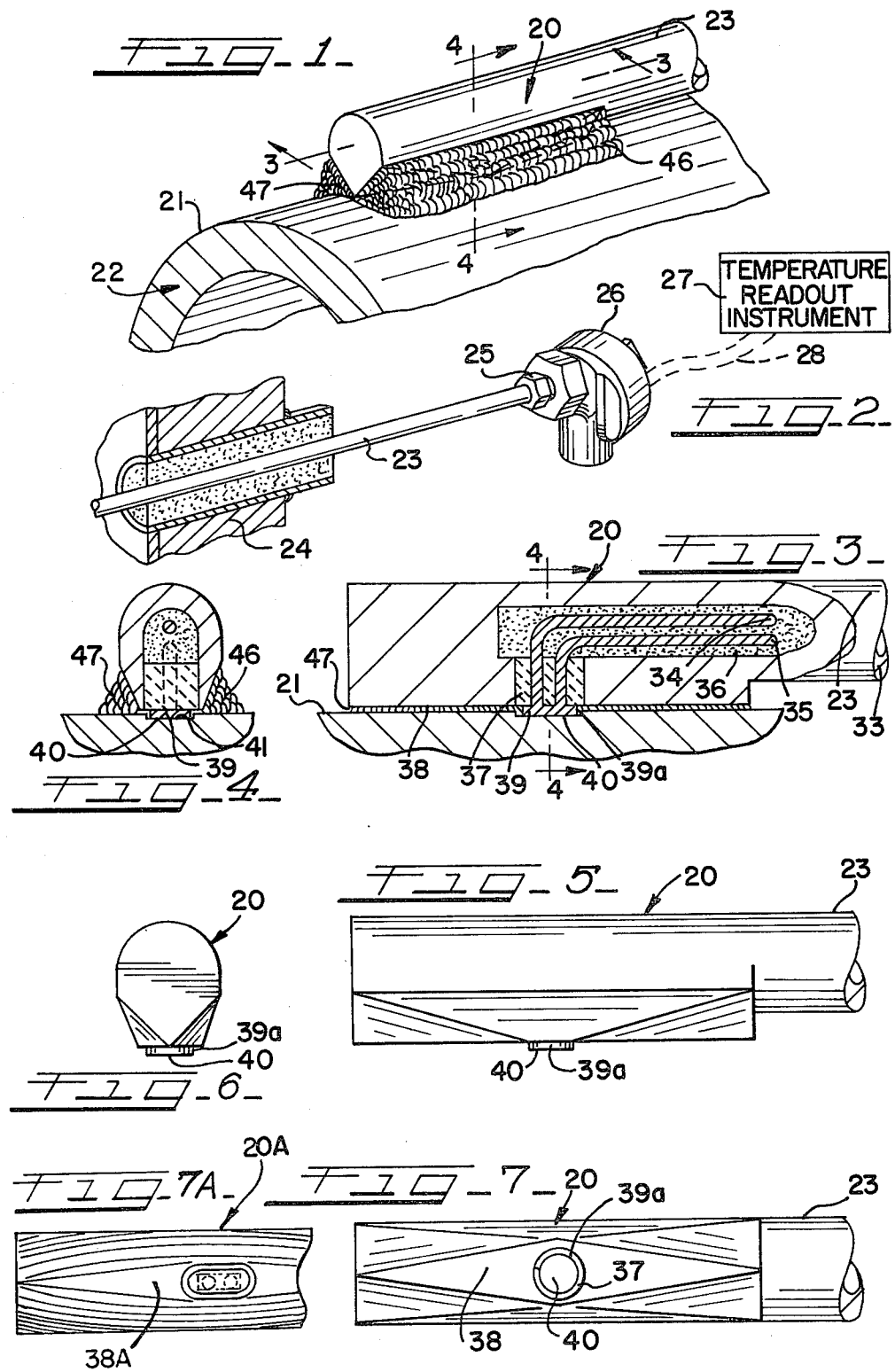

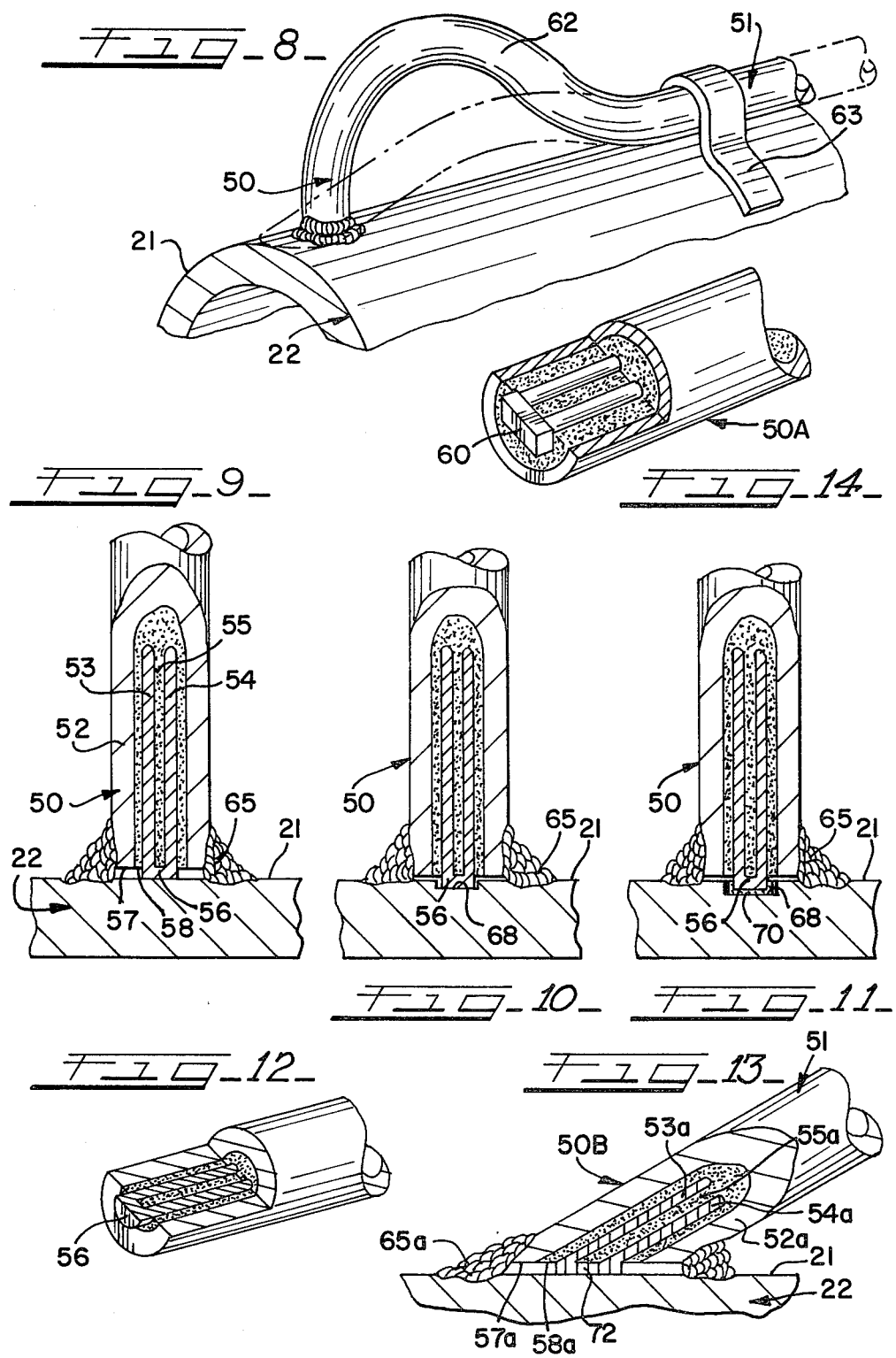

THERMOCOUPLE AND METHOD OF MAKING THE THERMOCOUPLE AND OF MOUNTING THE THERMOCOUPLE ON A HEAT EXCHANGER TUBE

DESCRIPTION

This invention relates in general to an improved thermocouple assembly for monitoring fires surfaces of heat exchangers, and more particularly to a thermocouple that is capable of more accurately measuring the tube surfaces in fired heat exchangers, and still more particularly to the method of making the improved thermocouple and the method of installing the thermocouple on heat exchanger tubes.

Heretofore, it has been well known to provide thermocouples for measuring the surfaces of fired heat exchangers. However, the long sought-after goal of measurement accuracy and usable thermocouple life has involved the development of a number of different thermocouple structures, none of which have provided the ultimate accuracy and life situations desired. Reliability particularly has been a problem.

One particular application for use of the thermocouple like that in the present invention is in connection with an oil refinery operation where crude oil is pumped through heat exchanger tubes of a heater or furnace under a high pressure of about 2500 to 3000 PSIG and where the tube walls, being subjected to combustion gases having a temperature of about 1600° F., are about 1150° F. to heat the crude oil. In such a heater having the surfaces of the heat exchanger tubes being subjected to the fire, it is important to monitor the temperature of the tube walls as accurately and reliably as possible in order to obtain the maximum throughput of product and run the process at optimum safety and efficiency and prevent tube damage or rupture. It is therefore significantly important to measure the tube surfaces accurately so that the highest possible operating temperatures of the heater can be maintained but not exceeded, thereby enhancing the energy consumption of the heater and the maximum efficiency. Preferably, it is therefore desired to maintain the firing of the heater at a substantially constant level which is dependent upon the accuracy and reliablity of thermocouples used to measure the heat exchanger tubes.

Moreover, since the life of a given thermocouple is generally dependent upon the maximum temperatures to which it is subjected, its own reliablity and accuracy can enhance its life so that it will remain in service as long as possible.

Inasmuch as a thermocouple for measuring a tube surface must be mounted on the exterior fireside surface of the tube, the thermocouple wire extending from the thermocouple to the exterior of the furnace and readout instrumentation is exposed to the combustion gases. For such high temperature applications, mineral oxide insulated metal sheathed thermocouple wire is generally used. Thus, the operating temperature of the sheath is higher than that of the tube wall since the tube wall is continuously giving up heat to a lower temperature fluid being pumped therethrough and it is at a substantially lower temperature than the combustion gases. This excessive heat must be absorbed by the sheath material, and it is therefore particularly important that it not be directed to the hot junction of the thermocouple and influence the temperature measured by the junction.

The most accurate heretofore known thermocouples have been of the knife-edge type where the thermojunction end or tip housing the junction has a knife-shaped portion engageable with and welded to the tube, such as shown in U.S. Pat. Nos. 3,874,239; 3,939,554 and 4,043,200, which positions the junction more closely to the tube wall and allows the junction to respond to a temperature more representative of the actual wall surface. The heat energy path from the sheath material goes mostly through the welds along each side of the knife edge, and this thermocouple, which is manufactured by ThermoCouple Products Company, Inc., of Winfield, Illinois, provides measurement accuracy within plus or minus 15° F. of actual surface temperatures under normal firing conditions. However, the junction is not isolated from the weld areas, thereby permitting some of the heat energy going through the weld areas to influence the temperature measured by the junction.

Others who have manufactured knife-edge type thermocouple units have spaced the junction even further from the tube surface than that allowed by the configurations in the above patents which provides even a greater temperature gradient between the tube surface and the junction. Deficiencies of other heretofore known units are set forth in the above patents.

The present invention overcomes the inaccuracy and reliability problems heretofore known by providing a thermocouple assembly for the above related high temperature applications having a significantly greater accuracy and reliability. The assembly includes a junction member at the end of mineral oxide insulated metal sheathed thermocouple wire which can be mounted on a tube wall so that it isolates the hot junction from the sheath and places the hot junction directly into pressurized engagement with the tube wall. The hot junction extends from the end of the sheathed wires and is structured to be thermally isolated from the sheath. The junction member engages the tube wall spacing the sheath and insulation from the tube wall. By welding the sheath directly to the tube wall, the heat energy path from the sheath goes through the weld areas directly to the tube and bypasses the hot junction. Since the conductors are substantially immovable relative to the sheath and are connected to the hot junction member, and the sheath is not in engagement with the tube surface, the natural shrinkage of the weld area sets up a pressure condition between the junction and the tube measured surface, thereby eliminating any gap between the junction and the measured surface and positioning the junction directly against the surface in optimum thermal contact.

It is therefore important to transmit the heat in the sheath directly to the tube wall and at the same time bypass the junction to allow the junction to more accurately measure the tube wall without being influenced by the higher level of the sheath. To prevent setting up a dam or block of the heat between the sheath and a tube, it is important that the cross-sectional area of the weld material interconnecting the sheath and the tube be greater than the sheath wall thickness. As such, it will not impede heat transfer so that the heat in the sheath can easily pass to the cooler surface of the tube.

It is also preferable to mount the thermocouple assembly so that the sheath extending from the thermojunction tip is in contact with the tube surface where possible as the sheath extends to the wall of the furnace or heater to assist in the transfer of heat from the sheath to the tube ahead of the junction. Where the junction is mounted to the tube wall such that the thermocouple tip extends substantially perpendicular to the tube wall, it is important to have the shortest possible bend from that point back to the tube surface so that the sheath gives up heat to the tube as efficiently as possible, thereby preventing deterioration of the thermocouple structure and the sheath. Moreover, maintenance of the heat level in the sheath as low as possible reduces its adverse influence on the junction. An alternative mounting arrangement where the thermocouple tip is angularly mounted to the tube permits the sheath to be brough to the tube wall quicker by decreasing the loop length (portion of sheathed wire between the connection of the thermocouple tip and the tube and the point along the sheathed wire ahead of the junction that engages the tube wall) and which ultimately will decrease the amount of heat that needs to be given up by the sheath.

It is therefore an object of the present invention to provide a new and improved thermocouple assembly for measuring temperatures of fired heat exchanger tubes which is more reliable and permits more accurate temperature measurement and a greater minimal usable life.

A further object of the present invention is in the provision of a new and improved thermocouple assembly which permits the junction to be in closer proximity with the measured surface to provide greater measurement accuracy.

Another object of the present invention is to provide a new and improved thermocouple assembly for measuring relatively high temperatures of fired heat exchanger tubes and to prevent contact of the combustion gases with the thermocouple conductors through the use of a heavy wall sheath, highly compacted insulation and leak-free attachment welds.

A further object of the present invention is to provide a new and improved thermocouple assembly which electrically isolates the thermojunction from the tube wall and yet permits responsive and accurate temperature measuring operation.

Another object of the present invention is to provide a new and improved method for making a thermocouple assembly which will provide more accurate measurement of fired heat exchanger tubes.

Still another object of the invention is to provide an improved method for mounting a thermocouple on a fired heat exchanger tube in order to provide more accurate and reliable measurement of the tube.

A still further object of this invention is in the provision of a new and improved thermocouple assembly and a method for mounting the assembly on a fired heat exchanger tube which isolates the junction from the higher heat level of the lead-in material for the junction.

Other objects, features and advantages of the invention will be apparent from the following detailed disclosure, taken in conjunction with the accompanying sheets of drawings, wherein like reference numerals refer to like parts.

FIG. 1 is a fragmentary perspective view of heat exchanger tube having one form of the thermocouple assembly of the present invention mounted thereon;

FIG. 2 is a perspective view of the readout end of the thermocouple assembly and illustrating it as extending through the wall of a heater or furnace within which the thermocouple is installed;

FIG. 3 is a greatly enlarged vertical sectional view taken through the junction end of the assembly in FIG. 1 substantially along line 3—3 thereof;

FIG. 4 is a vertical transverse sectional view taken through the thermocouple assembly of FIG. 1 and substantially along line 4—4 thereof and also along line 4—4 of FIG. 3;

FIG. 5 is a side elevational view of the thermojunction tip of the assembly of FIG. 1 prior to mounting it on a tube;

FIG. 6 is an end elevational view of the thermojunction tip of FIG. 5;

FIG. 7 is a bottom plan view of the thermojunction of FIG. 5;

FIG. 7A is a view similar to FIG. 7 showing a modification where the junction and insulator are oval-shaped as shown in solid lines and the junction member is bar-shaped in phantom;

FIG. 8 is a perspective view of a modified thermocouple assembly according to the invention as mounted on a tube and also showing a still further modification in phantom;

FIG. 9 is a vertical sectional view taken through the embodiment of FIG. 8 and illustrating one type of mounting the thermojunction tip on a tube;

FIG. 10 is a view similar to FIG. 9 but illustrating another manner of mounting the thermojunction tip on a tube where the tube surface is provided with a recess in which the junction is received;

FIG. 11 is a view similar to FIG. 10 but illustrating a still further method of mounting the thermojunction tip on a tube where the junction is electrically insulated from the tube;

FIG. 12 is a perspective sectional view taken through the junction end of the thermojunction tip of FIGS. 8-11 to further illustrate the relation of the junction to the end of the sheath;

FIG. 13 is a vertical sectional view taken through the thermocouple assembly like that in FIG. 8 but where the thermojunction tip is inclined to the surface of the tube and which is also represented in phantom in FIG. 8; and FIG. 14 is a view similar to FIG. 12 of a modification where the junction member is in the form of a bar.

Referring now the drawings and particularly to FIGS. 1 to 7, a knife-edge type thermojunction tip according to the invention and generally designated by the numeral 20 is illustrated in mounting relation on the fired surface 21 of a heat exchanger tube 22. It may be appreciated that the thermojunction tip 20 is of the type that not only can be mounted in a longitudinal fashion along a heat exchanger tube as illustrated but also it may be mounted transversely of the tube, as shown in U.S. Pat. No. 3,874,239. The configuration of the face of the thermocouple which is disposed adjacent to the tube surface 21 for which the temperature is measured may be seen by looking at the views of FIGS. 5, 6 and 7 and which will be further explained hereafter. The entire thermocouple system includes a thermojunction tip or junction end from which extends insulating thermocouple wires or conductors in a structure sheath identified in this embodiment by the numeral 23 leading from the junction end to a point outside of the wall of a heater or furnace in which the thermocouple is mounted, as illustrated in FIG. 2. The heater wall is identified by the numeral 24, and the sheath structure 23 has a fitting 25 connected to a terminal head 26 that in turn interconnects to a temperature readout instrument 27 through a pair of leads 28.

The sheath structure 23 is suitably supported in the wall 24 and includes a tubular sheath 33 within which a pair of thermocouple wires or conductors 34 and 35 are arranged in spaced apaart relationship from each other and from the sheath and insulated from each other and the sheath by a suitable high temperature insulating material 36. The insulation 36 may be of a suitable mineral oxide type such as magnesium oxide, aluminum oxide, or beryllium oxide, which is initially provided in granular or powdered form but compacted into a solid in the sheath so that the conductors are fully supported therein in insulated relation to each other and to the sheath and so that the material holds together in solid form without the use of any binder. Moreover, the compacted insulation eliminates any spaces within the sheath to prevent the passage of gases within the sheath which would be deleterious to the conductors and the junction. The metal sheath may be inconel, stainless steel or any other metal that can withstand high temperatures encountered in the chosen environment.

The thermocouple conductors 34 and 35 are bent at right angles in the thermojunction tip 20 to extend through an opening in the sheath wall in a manner similar to the way it is constructed in U.S. Pat. No. 3,874,239. A ceramic insulator 37 is provided for the conductors and extends out to the face 38 of the thermojunction tip. A hot junction member 39, in the form of the disk here but which may be in the form of a bar as will be later described, is suitably connected such as by welding to the ends of the thermocouple conductors 34 and 35 and which therefore extends from the face 38 of the thermojunction tip. The junction member 39 is sized so that it fully interconnects the conductors but has its exterior periphery 39a spaced from the metal portion of the thermojunction tip which is an extension of the sheath wall 33, so that the junction member is not affected by the temperature level of the sheath wall. The outer face 40 of the junction member is flat as shown to mate and engage with a flat surface 41 on the heat exchanger tube surface 21. As illustrated in FIGS. 3 and 4, the junction engaging tube surface 41 is recessed from the flat surface 21 although it can be appreciated that the junction member if formed with an arcuate surface could be applied directly against the arcuate surface 21 of the tube, it being important that there be the best possible mating contact relation between the junction member and the measured surface of the tube. The depth of the recess having the flat surface 41 is less than the height of the junction member 39 so that when the junction member face 40 is placed in engagement with the tube flat surface 41, the face 38 of the thermocouple head 20 is in spaced relation from the surface 21 of the heat exchanger tube 22. This is important when the thermojunction tip is mounted onto the tube wall by welding in order to pressurize the contact between the junction member surface 40 and the tube measured surface 41, as explained hereafter. The recess may be formed by spot facing which results in forming a flat and recessed surface. Moreover, spot facing minimizes the space between the sheath and tube wall, thereby allowing the weldment to be shorter and reducing the weldment heat path. While the side walls are shown to be flat in FIGS. 4 to 7, they may be curved, as illustrated in FIG. 7A.

As seen in FIG. 7, the face 38 of the thermojunction tip 20 is substantially flat and diamond-shaped in configuration. Inclined surfaces are defined upwardly to the sheath which ultimately receive the weld that secures the thermojunction tip to the heat exchanger tube. The width of the surface 38 at the junction member 39 is slightly wider than the opening receiving the ceramic insulator 37. The cross section of the insulator is circular as is the junction member, but they may be oval, as seen in FIG. 7A for the thermojunction tip 20A. The junction member in FIG. 7A may also be bar-shaped like in FIG. 14 and as shown in phantom which would extend parallel to the longitudinal axis of the sheath 23. The width of the flat surface 38A would be less for this embodiment than where a disk-shaped junction member is used. This would result in bringing the opposite surfaces receiving the weld passes closer together at the face 38a, thereby reducing the unwelded area and spacing the opposite weldments closer together to speed up the heat transfer between the tip and the tube.

When mounting the thermojunction tip 20 to the tube surface 21, a plurality of weld passes are made on opposite sides along the inclined surfaces to define the void-free and leakproof welds 46 and 47 shown in FIGS. 1 and 3. The weld material has a cross section greater than the wall thickness of the sheath 23 so to provide a resistance-free heat energy path from the sheath wall to the tube 22. Further, the welds 46 and 47 completely seal the junction head of the thermocouple to the tube to prevent any combustion gases from reaching the hot junction. The opposite ends of the welds 46 and 47 unite so as to provide a complete peripheral seal between the thermojunction tip and the tube. Inasmuch as the junction member is insulated from the sheath wall or its extension and the heat path from the sheath wall to the tube is through the welds 46 and 47, the junction is isolated from any heat level for the sheath wall. Thus, the higher heat level in the sheath is transferred to the cooler tube wall surface through the welds 46 and 47, thereby bypassing the junction member 39 and permitting the junction member to respond more accurately to the temperature of the tube surface. Inasmuch as the welds 46 and 47 have a natural shrinkage factor following application, they set up a pressurized condition between the mating surface of the junction member and the tube wall, in order to prevent any gap to exist between the junction member and the tube wall and thereby provided the most accurate temperature measurement possible. Moreover, the junction of the thermocouple is as close to the tube wall as possible since the junction exists beyond the insulator 37 and at the junction member 39.

A modified thermojunction tip according to the invention is shown in FIGS. 8 to 14 in that the hot junction is formed directly at the end of the sheath. The method of mounting this embodiment to a fired heat exchanger tube may take many forms where it is mounted to be perpendicular or angular to the tube. It may be mounted by any of the methods illustrated in FIGS. 9, 10 and 11 and where it is mounted angularly to the tube that method is illustrated in FIG. 13. Further, a modified bar-shaped junction member which has been referred to above is illustrated in FIG. 14.

The thermojunction tip which mounts perpendicularly to the tube, as seen in FIGS. 8 to 12, is generally designated by the numeral 50 and is formed at the end of the sheath 51. The tip is generally cylindrical in shape. The sheath 51 is the same as the sheath 23 in that it includes, as particularly seen in FIGS. 9, 10 and 11, a sheath 52, a pair of thermocouple wire conductors 53 and 54 extending within the sheath wall 52 and being insulated from each other and from the sheath by compacted mineral oxide insulation material 55. As in the earlier embodiment, the sheath is of a suitable metal which will withstand high temperature conditions. The end of the sheath material at the thermojunction tip 50 is sliced off perpendicularly to the axis of the sheath 51 defining a circular face and thereafter a junction member 56 is suitably secured to or formed at the ends of the conductors 53 and 54 such as by welding a suitable junction member thereto. Again, the end surface of the sheath wall, as indicated by the numeral 57, is essentially coplanar with the end surface 58 of the insulation, both of which define the face of the thermojunction tip, while the junction member 56 extends beyond these surfaces to protrude from the thermojunction tip 50, as particularly seen in FIGS. 9 to 11. The junction member 56, as shown in FIGS. 9 to 12, is in the form of a disk although it may be in the form of a bar such as the junction member 60 illustrated in FIG. 14. In either case, the outer surface of the junction member which is to engage the tube would preferably be formed to mate with the tube surface so that when mounted on a tube, it would provide the best possible contact between the junction member and the tube surface to be measured.

Where the thermojunction tip 50 is mounted so that it is essentially perpendicular to the tube, as seen FIGS. 8 to 11, the sheath 51 is provided with the smallest possible bend or loop to bring the sheath material back to the surface of the tube as quickly as possible. The bend will be as sharp as possible but not such as to damage the integrity of the sheath structure. In FIG. 8 the bend is indicated by the numeral 62 and the sheath is brought back to the surface of the tube and retained thereon by use of a retaining member or clip 63. In FIG. 8 the sheath is illustrated as extending longitudinally along the tube. If it is desired to have it extend perpendicular to the tube, if possible a bend would still be provided in the sheath and it would be brought back to a part of the tube surface and retained there by a clip to again assist in dissipating the heat of the sheath directly to the tube wall to the maximum extent possible.

Three different methods of mounting the thermojunction tip 50 on the tube surface 21 are illustrated in FIGS. 9, 10 and 11. In FIG. 9 the surface of the tube is left intact and the thermojunction tip is brought against the surface where the junction member mates with the surface. Thereafter, a plurality of weld passes 65 are made circumferentially of the thermojunction tip and to weld the sheath to the tube surface 21 of the tube 22. Again, it is important that the weld material cross section be greater than the cross section of the sheath wall 52 so as to provide an efficient transfer of heat energy from the sheath wall directly to the tube surface. By virtue of the junction member protruding from the thermojunction tip and being rigid with respect to the thermojunction tip so that it does not move longitudinally thereof, both the end surfaces 57 and 58 of the sheath wall and the insulation are maintained in spaced relation from the tube surface which is critical to take advantage of the weld material shrinkage. Further, the junction member 56 is sized so that it does not extend across the insulation 55 and come into contact with the sheath. Accordingly, the junction is thermally isolated from the sheath and the energy path between the sheath and the tube surface will bypass the junction member.

The method of mounting the thermojunction tip to the tube wall may be accomplished as illustrated in FIG. 10 where the tube may be spot-faced to define a recess such as in the form of a blind bore 68 which is first formed in the surface 21 of the tube wherein the junction member then is recessed from the tube surface. However, the distance that the end surface of the junction member extends from the end of the sheath and insulation is such that when the sheath is welded to the tube surface 21, a gap will still remain between the end surfaces 57 and 58 of the sheath wall and the insulation and the tube surface to again allow a thermal bypass path of the junction 56 between the sheath wall and the tube.

When it may be desired to electrically isolate or insulate the junction member 56 from the tube, an insulating cap 70 of ceramic or other insulating material may be provided over the end of junction member and between it and the tube and where a recess is provided in the tube, as shown in FIG. 11. It can be appreciated that such an insulating member may also be in the form of a flame or plasma ceramic coating applied to the junction member as well as a ceramic cup which would be a separate element. Such an insulator could also be employed in the method of mounting the thermojunction tip to the tube as illustrated in FIG. 9 where no recess is formed in the tube surface.

The method of mounting the thermojunction tip having a bar-shaped junction member, as shown by the embodiment 50A in FIG. 14, would be as illustrated in FIGS. 9, 10 and 11 where the tube surface may be provided with or without a recess and the junction member may be electrically insulated from the tube surface in the same manner as above referred to. It may be further appreciated that the embodiment of FIGS. 1 to 7 may also be mounted onto the tube surface without the use of a recess in the tube surface or by use of an insulator to electrically insulate the junction member from the tube surface as referred to above with respect to FIGS. 9 to 11.

The thermocouple of the invention may also be formed at the end of the sheath material so that it may be mounted on a tube surface where the sheath material comes off at an angle to the tube surface as particularly illustrated in FIG. 13 and as shown in phantom in FIG. 8. This thermojunction tip designated generally by the numeral 50B is formed by slicing the sheath material 51 at an angle to the axis of the sheath material instead of perpendicularly to the sheath material. The tip 50B is generally cylindrically shaped with an elliptically shaped face. Thereafter a junction member 72 is suitably secured such as by welding to the end of the conductors 53a and 54a in the manner illustrated in FIG. 13. Again, the face including the end surfaces 57a of the sheath 52a and 58a of the insulator 55a would be mounted in spaced relation to the tube surface 21 by virtue of the junction member 72 protruding from the end of the sheath. The sheath is likewise welded to the tube surface 21 with a multiple of weld passes as indicated at 65a wherein the weld material extends circumferentially of the sheath and has a cross-sectional area greater than the cross-sectional area of the sheath 52a so as to provide a free heat energy path between the sheath and the tube. By angularly mounting the thermojunction tip to the tube as shown in phantom in FIG. 8, the sheath can be brought to the tube wall quicker or in effect the loop length can be decreased, thereby decreasing the amount of heat that needs to be given up by the sheath at the connection between the sheath and the tube, as then heat is also given up directly to the tube wall by the sheath which is in engagement therewith at a point back from the connection of the thermojunction tip to the tube. The angle between the thermojunction tip and the tube at the connection area can be decreased only to the point where it is still possible to fully weld the sheath wall to the tube surface; that is, the weld material must completely go along the sheath through its entire circumferential end area.

In view of the foregoing, it may be appreciated that the thermojunction tip of the present invention may be made from a bulk length of mineral oxide insulated metal sheathed thermocouple wires in the knife-edge form as shown in FIGS. 1 to 7 or the cylindrical form shown in FIGS. 8 to 14, so that the junction member extends from the end of the thermojunction tip and is isolated from the sheath wall or other supporting metal material; and so that the method of mounting the thermocouple to a tube wall may be carried out to space the face of the head from the tube surface whereby the junction member will be thermally isolated from the heat energy passing between the sheath or surrounding metal supporting structure and the tube surface and so the member will be in pressurized engagement with the tube.

It will be understood that modifications and variations may be effected without departing from the scope of the novel concepts of the present invention, but it is understood that this application is to be limited only by the scope of the appended claims.

The invention is hereby claimed as follows:

1. A thermocouple assembly for measuring the surface temperature of a fired heat exchanger tube comprising, a cold junction end having a temperature readout instrument and a hot junction end having a temperature sensing junction member, the ends being connected by sheathed thermocouple conductors, said sheathed thermocouple conductors including an elongated tubular metal sheath, a pair of spaced thermocouple conductors within said sheath, electrical insulating material spacing and supporting said conductors within the sheath in insulating relation from each other and from the sheath, said hot junction end being defined by a thermojunction tip, said tip including a face which the conductor ends, insulation and sheath are substantially coplanar, a junction member against the face and connected to said conductors and extending from the face of said sheath and spaced from the sheath to thermally isolate the junction member from the sheath when applied to the measured surface.

2. A thermocouple assembly as defined in claim 1, wherein the thermojunction tip is knife-shaped.

3. A thermocouple assembly as defined in claim 2, wherein said face is diamond-shaped.

4. A thermocouple assembly as defined in claim 3, wherein said insulation material is circularly shaped and said junction member is disk-shaped.

5. A thermocouple assembly as defined in claim 3, wherein said insulation material is oval shaped and said junction member is oval-shaped.

6. A thermocouple assembly as defined in claim 3, wherein said insulation material is oval shaped and said junction member is bar-shaped.

7. A thermocouple assembly as defined in claim 1, wherein the thermojunction tip is cylindrically shaped and said face extends substantially perpendicular to said sheath axis.

8. A thermocouple assembly as defined in claim 4, wherein said face is circularly shaped.

9. A thermocouple assembly as defined in claim 1, wherein the thermojunction tip is cylindrically shaped and said face extends substantially angular to said sheath axis.

10. A thermocouple assembly as defined in clim 9, wherein the face is elliptically shaped.

11. A thermocouple assembly as defined in claim 1, wherein the junction member includes an outer face that is substantially flat to mate with the surface of the tube on which it is mounted.

12. A thermocouple assembly as defined in claim 1, wherein the junction member is disk-shaped.

13. A thermocouple assembly as defined in claim 1, wherein the junction member is bar-shaped.

14. A thermocouple assembly as defined in claim 1, wherein the junction member is oval-shaped.

15. A thermocouple assembly as defined in claim 1, wherein the outer face of the junction member is provided with electrically insulating means to electrically insulate it from the measured surface.

16. The method of making a thermocouple assembly from a bulk length of mineral oxide insulated metal sheathed thermocouple wires, wherein the length includes an elongated tubular metal sheath, a pair of spaced thermocouple conductors within said sheath, said mineral oxide insulating material spacing and supporting said conductors within the sheath in electrical and thermal insulating relation from each other and from the sheath, forming a thermojunction tip on an end of said length including a metal sheath having a knife-shaped edge defining a diamond-shaped face in which an opening is provided having thermocouple conductors held in spaced relation from each other and from the sheath by an insulating member including the step of making and securing a junction member to said conductors which protrudes from said face but which is sized to allow the insulating member to be exposed between the junction member and the sheath.

17. The method defined in claim 16, wherein the making of the junction member includes forming it in disk shape.

18. The method defined in claim 16, wherein the making of the junction member includes forming it in oval shape.

19. The method defined in claim 16, wherein the making of the junction member includes forming it in bar shape.

20. The method of making a thermocouple assembly from a bulk length of mineral oxide insulated metal sheathed thermocouple wires, wherein the length includes an elongated tubular metal sheath, a pair of spaced thermocouple wires within said sheath, and said mineral oxide insulating material spacing and supporting said conductors within the sheath in electrical and thermal insulating relation from each other and from the sheath, forming a thermojunction tip on an end of said length defining a face where the sheath, insulation and wire ends are substantially coplanar, and securing a junction member across said wires and against the insulation but in spaced relation to the sheath so that the junction member protrudes from said face.

21. The method defined in claim 20, wherein the method of forming the thermojunction tip includes shaping it to be knife-shaped with a diamond-shaped face.

22. The method defined in claim 20, wherein the method of forming the thermojunction tip includes shaping it to be cylindrically shaped with a circular-shaped face.

23. The method defined in claim 20, wherein the method of forming the thermojunction tip includes shaping it to be cylindrically shaped with an elliptically shaped face.

24. The method as defined in claim 20, which further includes the step of making the junction member to be disk-shaped.

25. The method as defined in claim 20, which further includes the step of making the junction member to be bar-shaped.

26. The method as defined in claim 20, which further includes the step of making the junction to be oval-shaped.

27. The method of mounting a thermocouple assembly on the fired surface of a heat exchanger tube, wherein the tube is externally subjected to high temperature gases and carries a fluid under pressure to be heated, and wherein the thermocouple assembly includes a cold junction end having a temperature readout instrument and a hot junction end having a temperature sensing junction member, the ends being connected by sheathed thermocouple conductors, said sheathed thermocouple conductors including an elongated tubular metal sheath, a pair of spaced thermocouple conductors within said sheath, electrical insulating material spacing and supporting said conductors within the sheath in insulating relation from each other and from the sheath, said hot junction end being defined by a thermojunction tip, said tip including a face in which the conductor ends, insulation and sheath are substantially coplanar, a junction member against the face and connected to said conductors and extending from the face of said sheath and spaced from the sheath to thermally isolate the junction member from the sheath when applied to the measured surface, which method comprises, the steps of positioning the thermojunction tip on the tube surface so that the outer face of the junction member mates with said tube surface and the face is in spaced relation thereto, and applying a plurality of weld passes between the periphery of the sheath and the tube to define a void-free and leakproof weldment to prevent contact between the gases and the conductors, the number of weld passes being such that the cross section of the weldment is greater than the cross section of the sheath wall to define an unimpeded heat transfer path between the sheath and the tube, whereby the natural shrinkage of the weldment pressurizes the junction member against the tube surface, the face is in spaced relation to the tube surface and the heat energy of the sheath goes through the weldment to the tube and bypasses the junction member.

28. The method defined in claim 27, which further includes the step of forming a recess in the tube surface into which the junction member is disposed.

29. The method defined in claim 27, which further includes applying electrical insulating means to the junction member to electrically insulate it from said tube.

30. The method defined in claim 28, which further includes applying electrical insulating means to the junction member to electrically insulate it from said tube.

31. The method defined in claim 27, which further includes the step of bringing the sheathed conductors away from the junction back to the tube surface as quickly as possible to assist in having the sheath give up heat to the tube.

32. The method of mounting a thermocouple assembly on the fired surface of a heat exchanger tube, wherein the tube is externally subjected to high temperature gases and carries a fluid under pressure to be heated, and wherein the thermocouple assembly includes a bulk length of mineral oxide insulated metal sheathed thermocouple wires having an elongated tubular metal sheath, a pair of spaced thermocouple wires within said sheath, and said mineral oxide insulating material spacing and supporting said conductors within the sheath in electrical and thermal insulating relation from each other and from the sheath, and a thermojunction tip formed on an end of said length defining a face where the sheath, insulation and wire ends are substantially coplanar, and a junction member against the insulation and connected to said wires but in spaced relation to the sheath so that the junction member protrudes from the face, which method comprises, the steps of positioning the thermojunction tip on the tube surface so that the outer face of the junction member mates with said tube surface and the face is in spaced relation thereto, and applying a plurality of weld passes between the periphery of the sheath and the tube to define a void-free and leakproof weldment to prevent contact between the gases and the conductors, the number of weld passes being such that the cross section of the weldment is greater than the cross section of the sheath wall, whereby the natural shrinkage of the weldment pressurizes the junction member against the tube surface, the face is in spaced relation to the tube surface and the heat energy of the sheath goes through the weldment to the tube and bypasses the junction member.

33. The method defined in claim 32, which further includes the step of electrically insulating the junction member from the tube.

34. The method defined in claim 32, which further includes spot-facing the tube for receiving the junction member.

* * * * *

UNITED STATES PATENT AND TRADEMARK OFFICE
CERTIFICATE OF CORRECTION

PATENT NO. : 4,477,687
DATED : October 16, 1984
INVENTOR(S) : Philip F. Finney

It is certified that error appears in the above—identified patent and that said Letters Patent is hereby corrected as shown below:

```
Col. 3, line 62, after "of" insert --the--;
Col. 5, line 6, change "apaart" to --apart--;
        line 30, change the first occurrence of "the" to --a--;
Col. 6, line 46, change "provided" to --provide--;
Col. 9, line 43, before "which" insert --in--;
Col. 10, line 5, change "clim" to --claim--.
```

Signed and Sealed this

Second Day of April 1985

[SEAL]

Attest:

DONALD J. QUIGG

Attesting Officer    Acting Commissioner of Patents and Trademarks